United States Patent
Bray et al.

(10) Patent No.: US 10,158,657 B1
(45) Date of Patent: Dec. 18, 2018

(54) RATING IP ADDRESSES BASED ON INTERACTIONS BETWEEN USERS AND AN ONLINE SERVICE

(71) Applicant: Microsoft Technology Licensing, LLC, Redmond, WA (US)

(72) Inventors: Jenelle Bray, Sunnyvale, CA (US); Grace Tang, Los Altos, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 481 days.

(21) Appl. No.: 14/819,808

(22) Filed: Aug. 6, 2015

(51) Int. Cl.
- *H04L 29/06* (2006.01)
- *H04L 29/08* (2006.01)
- *G06F 17/30* (2006.01)

(52) U.S. Cl.
CPC .... *H04L 63/1425* (2013.01); *G06F 17/30598* (2013.01); *H04L 67/22* (2013.01)

(58) Field of Classification Search
CPC . H04L 63/14; H04L 63/1408; H04L 63/1416; H04L 63/1425; H04L 63/1433; H04L 63/1441; H04L 67/22; G06F 17/30598
See application file for complete search history.

(56) References Cited

U.S. PATENT DOCUMENTS

| | | | | |
|---|---|---|---|---|
| 8,316,440 B1 * | 11/2012 | Hsieh | ................... | G06F 11/108 713/168 |
| 8,832,832 B1 * | 9/2014 | Visbal | ................ | H04L 63/1441 726/22 |
| 2004/0006708 A1 | 1/2004 | Mukherjee | | |
| 2004/0010447 A1 | 1/2004 | Asayama | | |
| 2004/0143469 A1 | 7/2004 | Lutz | | |
| 2005/0015624 A1 * | 1/2005 | Ginter | ..................... | G06F 21/55 726/4 |
| 2005/0055450 A1 | 3/2005 | Gang | | |
| 2007/0074169 A1 * | 3/2007 | Chess | ..................... | G06F 21/54 717/126 |

(Continued)

OTHER PUBLICATIONS

Tang, U.S. Appl. No. 14/937,974, filed Nov. 11, 2015, Office Action, dated Apr. 5, 2018.

*Primary Examiner* — Hadi S Armouche
*Assistant Examiner* — Alexander R Lapian
(74) *Attorney, Agent, or Firm* — Hickman Palermo Becker Bingham LLP (57) ABSTRACT

Techniques are provided for determining a reputation of a source address based on analytics of interaction history. In an embodiment, computers store interaction data that indicates a plurality of interactions between users and an online entity. For each interaction of the plurality of interactions, the interaction data indicates a source address of a user. For each source address of a plurality of source addresses indicated in the interaction data, the computers determine an aggregate measurement indicating aggregate behavior of users associated with an aggregate subset of interactions of the plurality of interactions. Each interaction of the aggregate subset is associated with said source address. The computers determine a negative measurement indicating negative behavior of users that are associated with a negative subset of interactions of the aggregate subset. The computers generate, based on the negative and aggregate measurements, a score that indicates a reputation of said each source address.

19 Claims, 5 Drawing Sheets

(56) References Cited

U.S. PATENT DOCUMENTS

| | | |
|---|---|---|
| 2007/0276858 A1 | 11/2007 | Cushman |
| 2007/0294296 A1 | 12/2007 | Silver |
| 2008/0005106 A1 | 1/2008 | Schumacher |
| 2011/0060905 A1 | 3/2011 | Stack |
| 2011/0296003 A1* | 12/2011 | McCann ............... G06F 21/316 709/224 |
| 2014/0172989 A1* | 6/2014 | Rubinstein .............. H04L 51/12 709/206 |
| 2015/0215325 A1* | 7/2015 | Ogawa .............. G06F 17/30091 726/23 |
| 2015/0339477 A1* | 11/2015 | Abrams ................ G06F 21/554 726/23 |
| 2015/0350229 A1* | 12/2015 | Mitchell ............. H04L 63/1425 726/23 |
| 2016/0021136 A1* | 1/2016 | McGloin ............. H04L 63/1458 726/23 |
| 2016/0127402 A1* | 5/2016 | Veeramachaneni .......................... H04L 63/1425 726/23 |
| 2016/0164903 A1* | 6/2016 | Murynets ............ H04L 63/1433 726/25 |

* cited by examiner

202 Store interaction data that indicates interactions between users and an online entity. For each user, the interaction data indicates a source address associated with that user.

204 For each source address indicated in the interaction data, determine an aggregate measurement indicating aggregate behavior of users that are associated with an aggregate subset of interactions. Each interaction of the aggregate subset is associated with that source address.

206 For each source address indicated in the interaction data, determine a negative measurement indicating negative behavior of users that are associated with a negative subset of interactions of the aggregate subset.

208 For each source address indicated in the interaction data, based on the negative measurement and the aggregate measurement, generate a score that indicates a reputation of that source address.

RATING IP ADDRESSES BASED ON INTERACTIONS BETWEEN USERS AND AN ONLINE SERVICE

FIELD OF THE DISCLOSURE

The present disclosure relates to automatic determination of internet protocol (IP) address reputation. Specifically, quantitative analytics of interaction history is used to score the reputation of an IP address or other source address.

BACKGROUND

Detection or prevention of online fraud is difficult in part because different modes of abuse present different patterns of activity. An online social network may be a fruitful environment for such fraud of varied purpose. For example email list washing, or other webpage scraping to harvest demographic data, may have an activity pattern that includes little or no social connecting with other users, but lots of webpage views. Whereas phishing, or other socially engineered scam, may have an opposite activity pattern with lots of social connecting and few webpage views.

Third party whitelists and blacklists may help characterize IP addresses to some extent. However, automatic detection of an IP address that is involved with an abusive campaign is a topic of ongoing research.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for automatically assessing a reputation of a network address based on analytics of interaction history. In an embodiment, one or more computers store interaction history that associates source addresses with interactions directed at an online entity. For each distinct source address in the interaction history, the computers perform analytics on interactions associated with that source address. The computers take measurements of those associated interactions, generally. The computers also take measurements of a subset of those associated interactions that indicate negative behavior of users at that source address. Based on the measurements of associated interactions and negative interactions, the computers calculate a reputation score for each analyzed source address. The reputation score is actionable and may be recorded, shared, and referred to when deciding subsequent authorization of resource access.

In embodiments, the online entity operates a website or web service, and each source address involves an IPv4 or IPv6 address.

In embodiments, each source address is characterized in ways that affect the reputation score. For example, the computers may characterize a source address as being affiliated with an environment that is well behaved, such as a corporation, or that is prone to abuse, such as a public cloud.

Example Computer System

Figure 1:
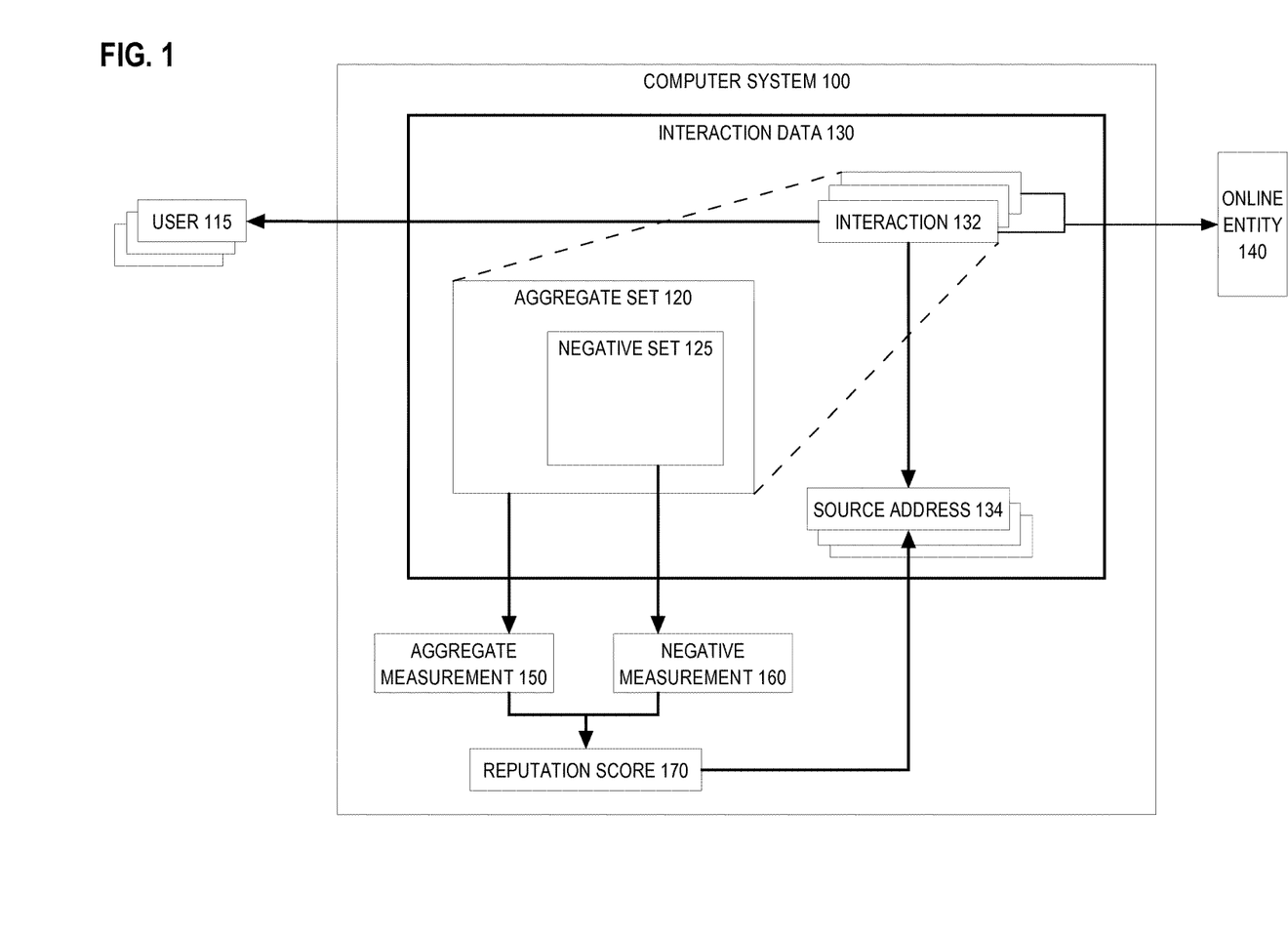
FIG. 1 is a block diagram that depicts an example computer system that automatically determines a reputation of a source address, in an embodiment.

FIG. 1 is a block diagram that depicts example computer system 100 for determining source address reputation, in an embodiment. Computer system 100 may be a rack server such as a blade, a personal computer, any computer capable of processing records, or any aggregation of these.

Computer system 100 stores interaction data 130, which may be database records, spreadsheet entries, file entries, or another durable data structure that has fields. Interaction data 130 may be managed by middleware that provides searching and indexing. For example, computer system 100 may achieve big data support by storing interaction data 130 in a storage subsystem, such as a Hive data warehouse backed by a Hadoop distributed file system (HDFS).

Interaction data 130 is a collection of historical interactions, such as interaction 132. Each interaction 132 describes an online interaction that occurred between a user, such as user 115, and online entity 140. Online entity 140 may operate a website or other online resource that users 115 may access over a computer network, such as the global Internet. User 115 may use any networked client device, such as a personal computer or smartphone, to interact with online entity 140.

User 115 may represent a human of any intent, a more or less disinterested robotic web crawler, a hand-crafted malicious script, or other network client computer program. An implementation of computer system 100 may exclude or otherwise specially process interaction 132 based on an automatic characterization of associated user 115. For example, computer system 100 may recognize and avoid processing or counting interactions 132 of a user 115 that is a known harmless robotic web crawler.

Although not shown, a client device that user 115 utilizes has a network address that the client device provides to online entity 140. For each interaction 132, computer system 100 records the network address of the client device as source address 134 within interaction data 130. Each interaction 132 has an associated source address 134.

Source address 134 may be an IP address, a media access control (MAC) address, a geocode, a device fingerprint, a browser fingerprint, a telephone number, or other identifier that more or less enables identification of client devices or client points of presence.

User 115 may have multiple interactions 132 with online entity 140, such as different or repeated webpage views. As such, user 115 may be associated with multiple interactions 132. If the multiple interactions 132, made by any users, originate from a same network address, then those interactions 132 share a same source address 134. Thus, a single source address 134 may be associated with many different users 115.

In operation, computer system 100 processes interaction data 130 and users 115 to determine a reputation score 170 for each of some or all source addresses 134. To score a given source address 134, computer system 100 selects interactions 132 that are associated with the given source address 134. Computer system 100 also selects the users 115 that are associated with the interactions 132 having the given source address 134. This is shown as aggregate set 120, which contains those users 115 that accessed online entity 140 from a network client device having the given source address 134.

Computer system 100 processes interaction data 130 and aggregate set 120 to measure, shown as aggregate measurement 150, an aggregate behavior originating from the given source address 134. For example, aggregate measurement 150 may include webpage views and logins that originated from the given source address 134, regardless of user identity. Dimensions within aggregate measurement 150, such as amount of webpage views and amount of logins, may be represented within aggregate measurement 150 as discrete measurements or combined into an integrated measurement.

Each interaction 132 may indicate whether a user was logged in, and if so, which user 115. If interaction 132 involved a user that was not logged in, then computer system 115 may create or retrieve a user 115 based on an hypertext transfer protocol (HTTP) cookie or a device fingerprint, such as a canvas fingerprint or other browser fingerprint. A browser fingerprint may be partly based on HTTP headers such as user agent and HTTP accept. A browser fingerprint may be partly based on attributes harvested by JavaScript such as screen resolution, time zone, installed plugins, multi-purpose internet mail extensions (MIME) types, and system fonts.

As such, computer system 100 may be configured such that interaction 132 always has an associated user 115. Alternatively, computer system 115 may be configured to recognize that lack of an associated user 115 indicates that an interaction 132 involved someone who was not logged in. In either case, interaction 132 always has an associated source address 134.

Computer system 100 also selects, from amongst the interactions of aggregate set 120, a negative set 125 of interactions that originate from a given source address 134 and that may indicate behavior that may be negative, aberrant, abnormal, or otherwise more or less correlated with abuse. For example, an interaction 132 may be an unsuccessful login attempt, an incorrect response to a completely automated public Turing test to tell computers and humans apart (CAPTCHA) picture, or any interaction by someone not logged into online entity 140.

Computer system 100 processes interaction data 130 and negative set 125 to measure negative behavior, shown as negative measurement 160. Negative measurement 160 may have dimensions that are discretely measured or integrated into a combined measurement.

An interaction may be imputed from one user to another. For example, online entity 140 may provide an online social network in which a first user may request that a second user agree to establishing a declared social connection between these two users. However, the second user may decline the request. Although such a declination is an interaction that originates from the second user, the significance of the declination is more relevant to a reputation of a source address of the first user, who issued a potentially bogus connection invitation.

For example, the first user may more or less indiscriminately invite a multitude of unfamiliar users to establish social connections in an attempt to achieve an appearance of popularity or professional importance. As such, computer system 100 may secondarily associate an interaction 132 with another user 115, in addition to the user that actually originated interaction 132. By this means or some other mechanism, computer system 100 may adjust negative measurement 160 based on an amount or fraction of connection invitations that originated at a given source address 134 and were declined.

Computer system 100 processes aggregate measurement 150 and negative measurement 160 to determine a reputation score 170 that indicates an assessed reputation of the given source address 134. Computer system 100 may record reputation score 170. A reputation score 170 that crosses a value threshold may be actionable and cause human or automatic activity.

Computer system 100 may semantically characterize the given source address 134 and adjust either reputation score 170 or the value threshold depending on the semantic characterization. Internet activity that originates from within corporations may be less likely to include abuse. As such, computer system 100 may decide and mark that the given source address 134 is for corporate use. Subsequent interactions originating from a source address that is characterized as corporate may be subjected to less involved security measures. Alternatively, computer system 100 may adjust reputation score 170 to be less likely to cross the value threshold if a source address is characterized as corporate.

Some characterizations of the given source address 134 may signify an increased likelihood of abuse. For example, a client device may be a member of a network of computers dedicated to abuse, such as a botnet. If the given source address 134 has indicia of membership in a botnet, then reputation score 170 of given source address 134 should be accordingly adjusted. For example, computer system 100 may characterize the given source address 134 as cloud-based or otherwise hosted, which is correlated with botnet membership.

Characterization of the given source address 134 as corporate may depend on numeric analytics. For example, computer system 100 may detect, either by inference or reference to a lookup table, that a cluster or subnet of source addresses are related. Computer system 100 may characterize as corporate those source addresses 134 that, perhaps along with related source addresses, are associated with some minimum number of users having a user account at online entity 140.

Furthermore, if computer system 100 has access to declared or inferred corporate affiliations of users having a user account, then computer system 100 may calculate a corporate percentage of users, having a user account and connecting from source address 134, that are affiliated with a same corporation. If that corporate percentage of users exceeds a threshold, then computer system 100 may characterize source address 134 as corporate. Alternatively, computer system 100 may delegate characterization of source address 134 to a third party IP-address intelligence database, such as MaxMind GeoIP.

Computer system 100 may aggregate the reputation scores 170 of source addresses 134 to produce an aggregate reputation score for an aggregate entity such as an organization, an access service network (ASN), an internet service provider (ISP), or a country. Computer system 100 may use an address database, such as MaxMind GeoIP, to determine in which aggregate entity a source address 134 belongs.

User 115 may be a premium member of online entity 140 or otherwise afforded special status. Such special status may cause the reputation score 170 of source address 134 to be less likely to cross a value threshold.

Ultimately, reputation score 170 may cause further investigation of the given source address 134. Reputation score 170 may cause access restrictions to be imposed upon the given source address 134 by online entity 140. For example, online entity 140 may decline subsequent online interactions that originate from the given source address 134. Online entity 140 may share reputation score 170 with interested parties.

Example Source Address Reputation Assessment Process

Figure 2:
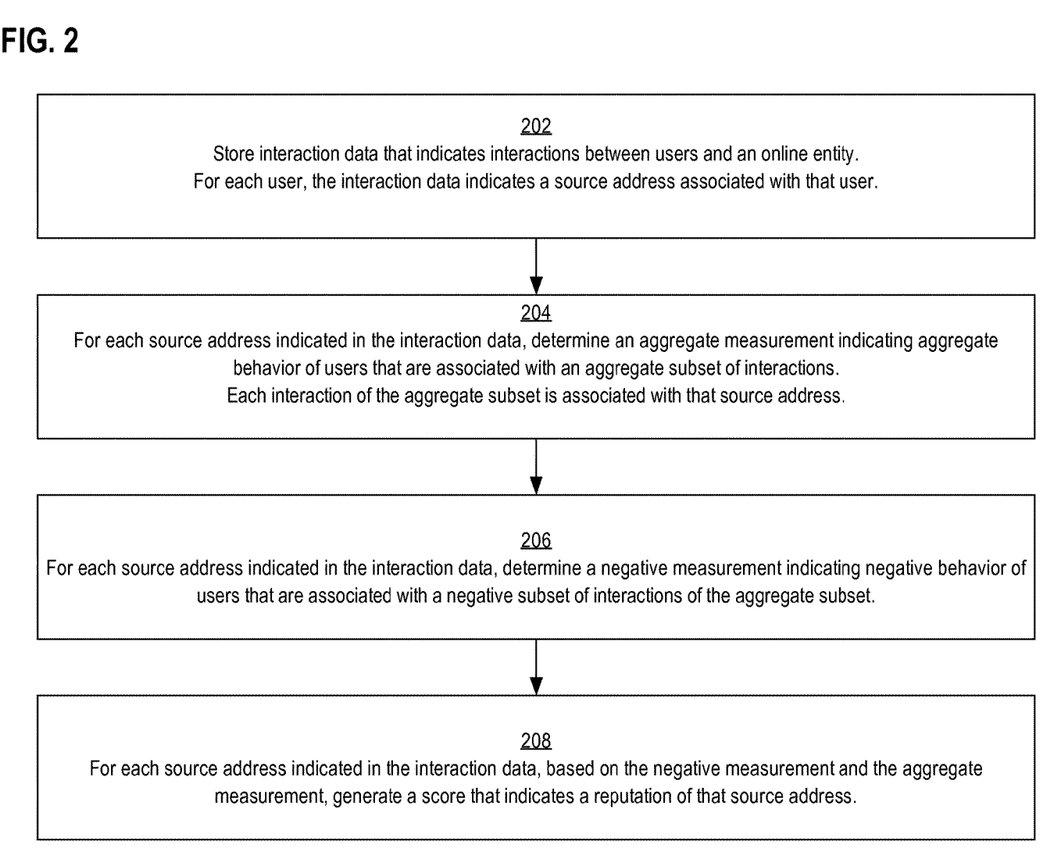
FIG. 2 is a flow diagram that depicts an example process for automatically determining a reputation of a source address, in an embodiment.

FIG. 2 is a flowchart that depicts an example source address reputation assessment process that may be performed by computer 100 or other embodiments.

Step 202 is preparatory and involves storing interaction data for later retrieval. For example, computer system 100 may maintain interaction records within a data warehouse. Data retention by the data warehouse may be limited according to recency, such as interactions no older than a month. The data warehouse may ingest interaction data from server logs, transactional databases, or other online sources. The interactions of web crawlers and other known disinterested and harmless robots may be excluded from the data warehouse.

Steps 204, 206, and 208 are repeated for each source address that originated interactions with the online entity. In step 204, aggregate behavior is measured from the interactions that originate from a given source address. For example, computer system 100 may select and analyze aggregate set 120 of interactions having the given source address. Computer system 100 may take measurements of interesting subsets of interactions of aggregate set 120. For example, computer system 100 may measure webpage views and measure logins.

In step 206, negative behavior is measured from the interactions that originate from a given source address. For example, computer system 100 may select and analyze negative set 125 of interactions having the given source address and bearing some indicia of negative behavior.

Indicia of negative behavior need not directly indicate abuse, but should have some statistical correlation with abuse. The statistical correlation may be proportional to the frequency of the interactions within negative set 125. For example, a few failed login attempts have little correlation with abuse. Whereas, hundreds of failed login attempts have substantial correlation with abuse.

In step 208, a reputation score of a source address is derived from at least the aggregate measurement and the negative measurement. For example, computer system 100 may use a mathematical formula that takes aggregate measurement 150 and negative measurement 160 as input parameters.

Aggregate measurement 150 and negative measurement 160 may include discrete measurements of interesting subsets of interactions, such as measured webpage views and measured logins. Computer system 100 may record reputation score 170, share it, and react to it if a value threshold is crossed.

Computer system 100 may also semantically characterize a source address. For example, characterization as corporate indicates that the source address is affiliated with a viable business and so is less likely to be a source of abuse. A source address may be characterized as abusive as a supplementary measure to the reputation score that aggregates the negative measurements over a different time frame. An abusive source address may be subjected to security friction such as a CAPTCHA or re-verification of an already verified email address.

A source address may be characterized as openly-accessible if it shows signs of being easy to access. For example, a robotic client may try to register using a freely assigned email address, such as hacker@Yahoo.com. The robot may have multiple source addresses from which it may attempt registration. Using a first source address, the robot may fail to correctly answer a CAPTCHA. The robot may try again using the same email address but from a second source address, and still fails to correctly answer a CAPTCHA. Finally, the robot tries again using the same email address, but from a third source address. During this third attempt, the robot is not confronted with a CAPTCHA, and the registration succeeds. Computer system 100 may be configured to deduce that these three source addresses are easy to access, are proxied, or are assigned by a VPN. Computer system 100 may characterize these three source addresses as openly-accessible and may give them more security friction because they are possibly abusive.

Example IP Reputation System

Figure 3:
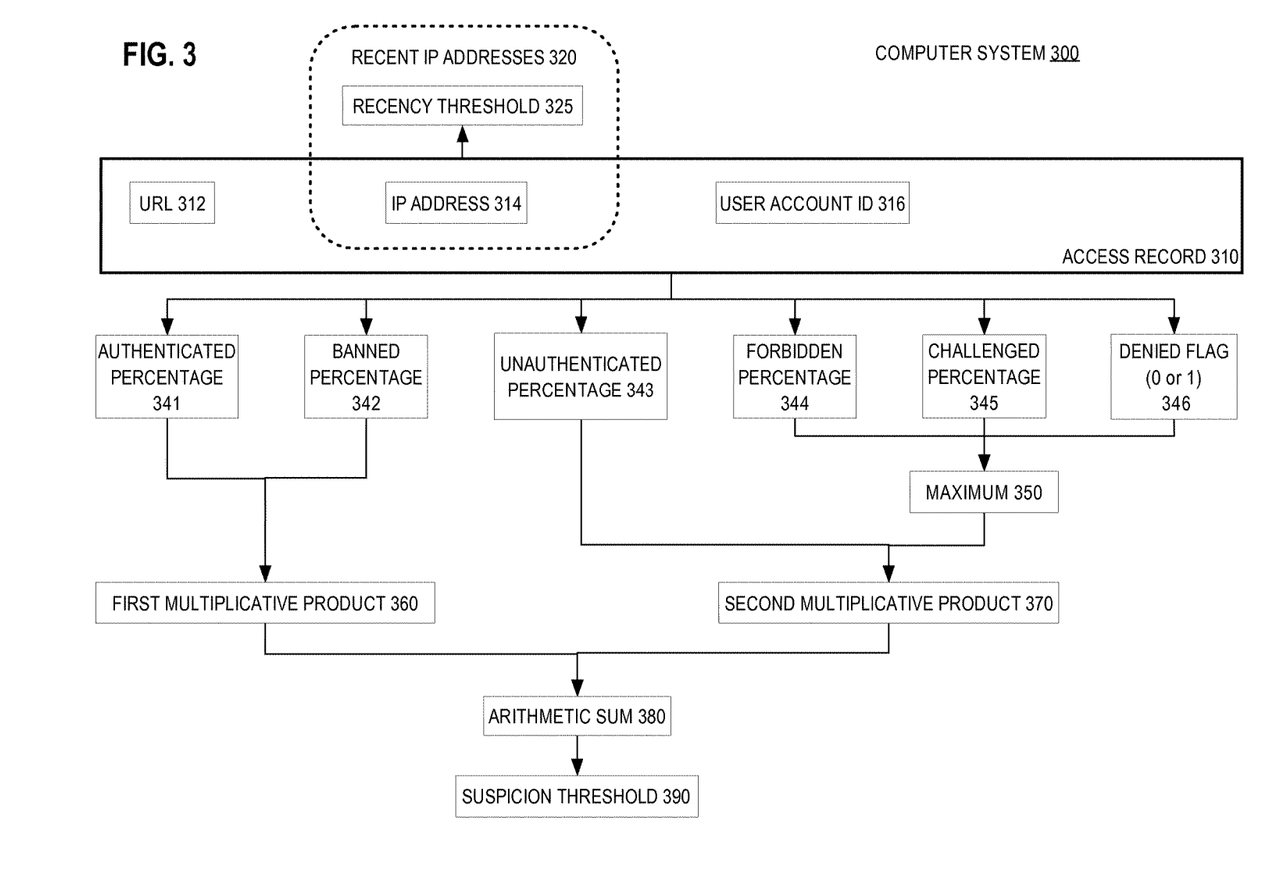
FIG. 3 is a block diagram that depicts an example computer that automatically determines a reputation of an IP address, in an embodiment.

FIG. 3 is a block diagram that depicts example computer system 300 for determining IP address reputation based on quantitative analysis of interaction history, in an embodiment. Computer system 300 may be an implementation of computer system 100. Computer system 300 calculates counts and ratios of various subsets of access records 310 to produce statistical information that computer system 300 uses to reliably score the reputation of an IP address.

Access record 310 may be an implementation of interaction 132. Each access record 310 documents an HTTP request made by a client device to access a web resource, such as a webpage or a headless web service. Access record 310 includes uniform resource locator (URL) 312, IP address 314, and user account identifier 316.

URL 312 has the request URL to which the client addressed the HTTP request. For example, URL 312 may have an address of a requested webpage. IP address 314 has the IP address of from which the HTTP request originated. Computer system 300 may obtain an IP address value from the transport control protocol (TCP) network layer that delivered the HTTP request.

An embodiment of computing system 300 need not determine an identity of a user based on IP address 314. For example, an IPv4 address may be reassigned to a different ISP customer, perhaps in a different residence, after expiration of a dynamic host configuration protocol (DHCP) lease.

Whereas, an IPv6 address may be too finely grained for modeling user isolation. For example, a user with multiple residential devices may interact with an online entity from several similar IPv6 addresses originating from within a household and each assigned to a different collocated device. As such and although IP address 314 may record an entire IPv6 address, computer system 300 may instead truncate, during storage or retrieval, an IPv6 address so as to include a subnet prefix, but not an entire IPv6 address.

URL 312 has textual parts that may indicate the nature of the HTTP request. For example, a login request may have an URL that is textually distinct from other page views. Although not shown, access record 310 may also include HTTP header fields, posted form data, browser fingerprint, or other transactional details.

User account identifier 316 indicates into which user account was the user logged into the web site or service that hosts the web resource being accessed. A user account identifier 316 without a value indicates that the user was not logged in when the HTTP request was processed. A guest is a user that has not logged in and may or may not have a user account. Login may occur by password, digital key, or other authentication mechanism. Automatic harvesting of a device fingerprint, browser fingerprint, an HTTP cookie, or telephone number of a smartphone may be sufficient to automatically log a user into the web site or service.

An access record 310 may be created for an HTTP request that went unfulfilled. For example, each failed attempt to login or answer a CAPTCHA may create an access record 310.

In operation, computer system 300 may filter away stale access records 310 that are older than recency threshold 325. As a result, computer system 300 selects recent IP addresses 320 to process. For a given IP address 314, computer system 300 calculates arithmetic sum 380, which measures the reputation of the given IP address 314.

Computer system 300 begins its numeric calculations by computing percentages of HTTP requests, of a particular kind or disposition, which bore indicia of negative behavior. Authenticated percentage 341 is the percentage, of all webpage views originating from the given IP address 314, that involved a user who was logged in. The presence or absence of user account identifier 316 in access record 310 indicates whether a user was logged in.

Banned percentage 342 is the percentage, of all login attempts originating from the given IP address 314, that failed because the user account indicated by user account identifier 316 was disabled. Computer system 300 multiplies banned percentage 342 times authenticated percentage 341 to calculate first multiplicative product 360.

Forbidden percentage 344 is the percentage, of all webpage views originating from the given IP address 314, which were denied. For example, a webpage that is identified by a particular URL resource path may be denied if the HTTP request bears a user agent string that matches a particular pattern. In another example, a webpage may be denied to users who are not logged in or are not logged into a particular user account.

Challenged percentage 345 is the percentage, of all login attempts originating from the given IP address 314, which involved a heightened security challenge. For example, a login page may ordinarily expect a password. Whereas a login page with a heightened security challenge may also present a CAPTCHA picture or ask a security question. A heightened security challenge may include two-factor authentication (2FA), such as by short message service (SMS) texting, telephone calling, or emailing.

Denied flag 346 may have a value of one if any account creation attempt originating from the given IP address 314 was ever or recently denied because of earlier suspicious activity that originated from the given IP address 314. Otherwise, denied flag 346 has a value of zero. For example, the given IP address 314 may have been temporarily blacklisted in the past.

Unauthenticated percentage 343 is the percentage, of all webpage views originating from the given IP address 314, which involved a user who was not logged in. The presence or absence of user account identifier 316 in access record 310 indicates whether a user was logged in.

In an embodiment, computer system 300 selects the maximum of forbidden percentage 344, challenged percentage 345, and denied flag 346. This maximum is shown as maximum 350. Computer system 300 multiplies maximum 350 times unauthenticated percentage 343 to calculate second multiplicative product 370.

Computer system 300 adds first multiplicative product 360 plus second multiplicative product 370 to calculate arithmetic sum 380. Arithmetic sum 380 is an actionable reputation score of IP address 314, which computer system 300 may record or share. Computer system 300 compares arithmetic sum 380 to suspicion threshold 390. If arithmetic sum 380 exceeds suspicion threshold 390, then computer system 300 may select IP address 314 for additional processing, such as administrative alerting. Different types of additional processing may have different suspicion thresholds 390.

In a preferred embodiment, computer system 300 may accumulate additional or alternative addends into arithmetic sum 380. An addend may involve a percentage, perhaps subjected to scaling to determine another multiplicative product. For example, an addend may involve a percentage, of all user accounts that were originally registered from the given IP address 314, that involve a user account that later became restricted for security purposes based on the behavior associated with the user account. In another example, an addend may involve a percentage, of all account registration attempts from the given IP address 314, that experienced an email delivery failure during registration email address verification.

Furthermore, an online entity may provide an application programming interface (API) for automated clients. For example, URL 312 may identify an entry point of a web service, such as with a representational state (REST) interface or a simple object access protocol (SOAP) interface. Usage of the API may be correlated with abuse. As such, access records 310 that indicate API usage may be accordingly processed to adjust arithmetic sum 380 or suspicion threshold 390 for a given IP address.

Computer system 300 may store arithmetic sum 380 or a flag that indicates that arithmetic sum 380 crossed suspicion threshold 390. Upon receipt of a subsequent HTTP request from a given IP address and although not shown, a web server may validate the HTTP request by retrieving arithmetic sum 380 of the given IP address. If the web server detects that arithmetic sum 380 is excessive, then the web server may deny the HTTP request.

Arithmetic sum 380 may be sticky. For example, the web server may deny the HTTP request based not on the current arithmetic sum 380, but rather based on a most recent calculation of arithmetic sum 380 that exceeded zero or some other threshold. For examples the web server may deny the HTTP request based on a most recent calculation of arithmetic sum 380 that is non-zero and at most three months old.

The web server may be configured to treat an HTTP request differently based on whether or not the user is logged in. The web server may use a different IP reputation threshold based on whether or not the user is logged in. For example, one threshold may cause denial of an HTTP request from an IP address by an anonymous user that is not logged in. Whereas, a different threshold may cause denial of a similar HTTP request from the same IP address by a user that is logged into a user account. Alternatively, the web server may exempt logged in users from threshold-based resource authorization.

Example IP Address Reputation Assessment Process

Figure 4:
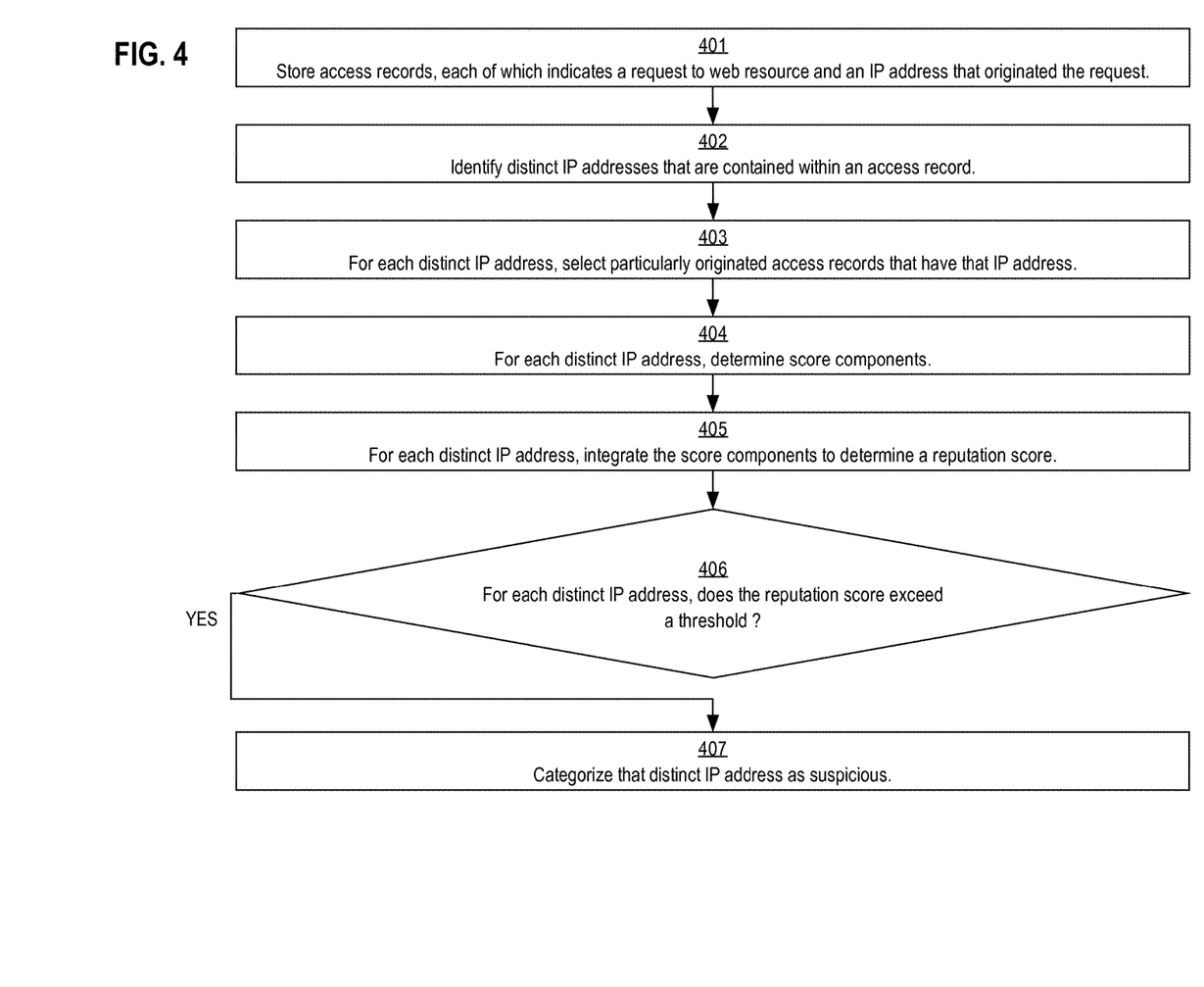
FIG. 4 is a flow diagram that depicts an example process for automatically determining a reputation of an IP address, in an embodiment.

FIG. 4 is a flowchart that depicts an example IP address reputation assessment process that may be performed by computer system 300 or other embodiments.

Step 401 is preparatory and involves storing access data for later retrieval. For example, computer system 300 may populate access records 310 from web server diagnostic logs or web server access logs. Stale access records 310 may be purged according to a retention policy.

Population of different fields within access records 310 may involve obtaining information from different website subsystems. For example, a web server may provide URL 312 and an indication of whether or not an HTTP request was denied. A TCP stack may provide IP address 314. A web application may provide user account identifier 316.

In step 402, unique IP addresses are gathered from access records. For example, computer system 300 may select distinct IP addresses 314 from access records 310. Stale access records 310 may be avoided by applying recency threshold 325 to exclude access records 310 that are too old. Computer system 300 may have other criteria that further limit which IP addresses 314 are analyzed.

Steps 403-407 are repeated for each distinct IP address that originated interactions with the online entity. In step 403 access history of a given IP address is selected for analytics. For example, computer system 300 may use a filter clause in a query to select access records 310 having IP address 314 that matches the given IP address. Computer system 300 may perform analytics directly on the selected access records 310. Computer system 300 may select interesting subsets of the selected access records 310 on which to perform further analytics. For example, an interesting subset may be those access records 310 that involved users that were not logged in, HTTP requests that were denied, or logins that involved a heightened security challenge.

In step 404, specific measurements are taken from the access records involving the given IP address. Computer system 300 determines specific percentages by counting access records 310 that have the given IP address and involve a general activity. For example, computer system 300 counts webpage views that originated from the given IP address 314 and then calculates which percentage of those webpage views involved users who were not logged in.

Among the measurements that computer system 300 may calculate during step 404 are authenticated percentage 341, banned percentage 342, unauthenticated percentage 343, forbidden percentage 345, denied flag 346, maximum 350, first multiplicative product 360, and/or second multiplicative product 370. Computer system 300 calculates one or more of these measurements for each IP address 314 that computer system 300 analyzes. Computer system 300 may accumulate additional or alternative addends into arithmetic sum 380. An addend may involve a percentage, perhaps subjected to scaling to determine another multiplicative product.

In step 405, a reputation score for the given IP address is calculated. For example, computer system 300 integrates the percentages of step 404 into arithmetic sum 380. Arithmetic sum 380 is an actionable reputation score of the given IP address 314. Computer system 300 may record or share arithmetic sum 380.

In step 406, the reputation score of each IP address is compared to a threshold. For example, computer system 300 compares arithmetic sum 380 to suspicion threshold 390. Computer system 300 may have different suspicion thresholds 390 for different purposes. For example, one suspicion threshold 390 may trigger increased security friction, such as CAPTCHA or email re-verification. Whereas another suspicion threshold 390 may trigger disablement of a user account.

If the reputation score of a given IP address exceeds a threshold, then step 407 is performed, which conditionally subjects the given IP address to additional processing, such as administrative alerting. For example, if an IP address is categorized as suspicious, then all requests associated with the IP address may be blocked or otherwise denied. As another example, if an IP address is categorized as suspicious, then the level of access to requested information (where the requests originate from the IP address) is restricted. For example, a registered member from the IP address may be limited to sending out only one connection request per day and submitting only three email address lookups per week.

In a related embodiment, instead of a binary categorization of suspiciousness (either suspicious or not suspicious), multiple categories or levels of suspiciousness are defined. For example, computer system 300 may define the following four categories: bad, very suspicious, somewhat suspicious, and not suspicious. Each category is associated with a different range of scores. Each category is also associated with a different set of actions to perform with respect to requests that originate from IP addresses that are categorized accordingly.

Training, Evaluation, and Calibration

The quantitative analytics of computer system 300 may be designed to distill a more or less simple reputation score from a wide assortment of attributes that occur along multiple dimensions. Furthermore, the analytics may be designed for bulk processing of IP addresses in the absence of dedicated human oversight. Computer system 300 may be more or less prone to faulty assessments of IP address reputations. As such, an initial training and evaluation phase may be needed to ensure that the quantitative analytics are well calibrated.

During training, computer system 300 may process a limited training dataset of well-understood access records. This training dataset may include historical interactions by some users that are known to be benign and other users that were found to be abusive, perhaps through manual forensic investigation by a data scientist. Alternatively, the training dataset may consist of artificial access records that are contrived to exemplify interesting behavior patterns, or a mix of natural and artificial access records.

The training dataset may be evaluated by a data scientist to manually determine an expected score for each IP address in the training dataset. The fitness of computer system 300 may be evaluated based on how well its generated scores match the expected scores.

An untrained system may exhibit score or threshold malfunctions that result in false positive or false negative assessments of IP address reputations. An untrained system may generate reputation scores that too tightly cluster around a norm and so lack a natural distribution needed to enable statistical discrimination. Alternatively, the generated scores may be too noisily scattered to infer meaning.

Suspicion threshold 390 may need adjustment during training to avoid false positives or negatives. The percentages and other numeric components, upon which arithmetic sum 380 is based, may have adjustable weights that enable tuning. Prior to integration into arithmetic sum 380, a numeric component may be formulaically adjusted or adjusted by a lookup table that imposes a step function or other nonlinearity to attenuate or exaggerate a value range.

Computer system 300 may be properly calibrated by sufficient iterative tuning. The goal of training is to achieve convergence such that the generated scores eventually match the expected scores to within an acceptable tolerance. After proper training, computer system 300 may be deployed into production.

During production operation, reputation scores may tend to be stable for each IP address, such that the scores change little over time. Excessive volatility of a reputation score of a given IP address may be grounds for classifying the address as suspicious even though suspicion threshold 390 is not crossed. Excessive volatility across many IP addresses may instead indicate that operating assumptions have changed, in which case computer system 300 may need recalibration, such as retraining.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
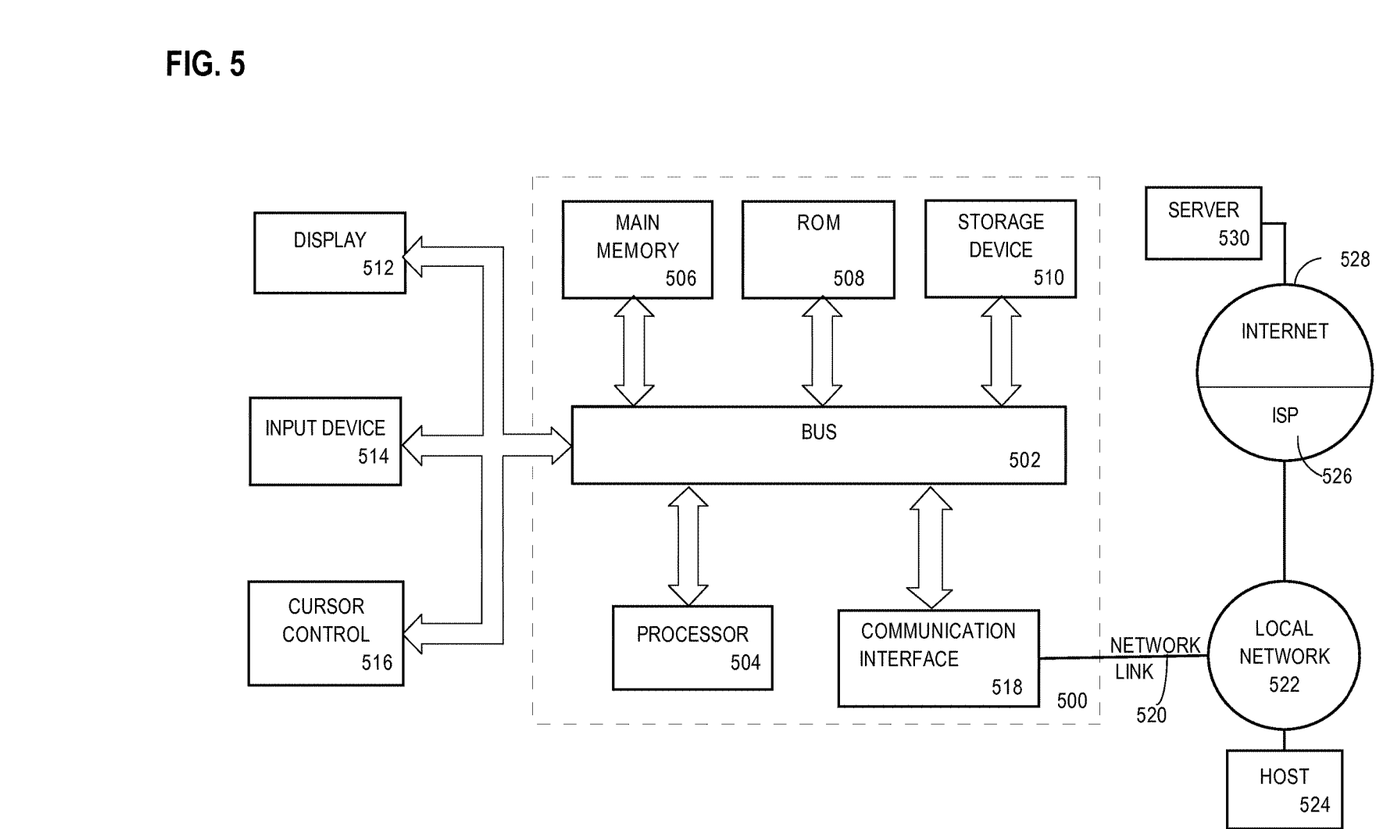
FIG. 5 is a block diagram that illustrates an example computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing interaction data that indicates a plurality of interactions between user accounts and an online entity;
   wherein, for each interaction of the plurality of interactions, the interaction data indicates a source address associated with a user account;
   wherein at least two interactions of the plurality of interactions indicate a same source address that is associated with a plurality of user accounts;
   for each source address of a plurality of source addresses indicated in the interaction data:
      determining an aggregate measurement indicating aggregate behavior of one or more user accounts that are associated with an aggregate subset of interactions of the plurality of interactions, wherein each interaction of the aggregate subset is associated with said each source address,
      determining a negative measurement indicating negative behavior of at least one user account of the one or more user accounts that is associated with a negative subset of interactions of the aggregate subset, wherein the negative measurement is based at least on a fraction, of webpage views that originated from said each source address, caused by users who were not logged into the online entity during a webpage view;
      generating, based on the negative measurement and the aggregate measurement, a score that indicates a reputation of said each source address;
   wherein the method is performed by one or more computing devices.

2. The method of claim 1 further comprising:
   receiving a request that is associated with a particular source address of the plurality of source addresses;
   in response to receiving the request:
      determining a particular score that is associated with the particular source address, and
      processing the request based on the particular score.

3. The method of claim 1 further comprising, if the score of said each source address crosses a value threshold, then categorizing said each source address as suspicious and performing additional processing on client requests associated with said each source address.

4. The method of claim 3 wherein generating the score comprises processing the negative measurement to increase the score and processing the aggregate measurement to decrease the score.

5. The method of claim 1 wherein:
   the one or more user accounts is a plurality of user accounts;
   the negative measurement is based at least on a fraction, of the plurality of user accounts that initiated webpage views from said each source address, that are included within the negative subset of interactions.

6. The method of claim 1 wherein the negative measurement is based at least on a fraction, of social connection requests sent from a user account associated with said each source address, that were declined by a member associated with the online entity.

7. The method of claim 1 wherein the negative measurement is based at least on an account creation request that originated, from said each source address, that was denied because of earlier suspicious activity from said each source address.

8. The method of claim 1 wherein the negative measurement is based at least on whether said each source address is categorized as at least one of: hosted, cloud-based, or for corporate use.

9. The method of claim 1 wherein the negative measurement is based at least on a count of application program interface (API) invocations, wherein the API invocations originate at said each source address, wherein the API invocations are directed to the online entity.

10. The method of claim 1 wherein said each source address comprises an internet protocol (IP) version 4 address or an IP version 6 subnet prefix, wherein said each source address does not comprise a whole IP address.

11. A method comprising:
   storing a plurality of access records, wherein each of the plurality of access records indicates a request to access one or more web resources, wherein each of the plurality of access records comprises a uniform resource locator (URL), an internet protocol (IP) address that originated the request, and a user account identifier of a user account of a user if the user was logged in;
wherein at least two access records of the plurality of access records indicate a same IP address that is associated with a plurality of user accounts;
identifying an interacting plurality of IP addresses, wherein each IP address of the interacting plurality is contained within an access record of the plurality of access records;
for each IP address of the interacting plurality:
selecting a set of access records from the plurality of access records, wherein each access record in the set of access records has an IP address that matches said each IP address;
determining one or more percentages, wherein each of the one or more percentages is based on a subset of the set of access records for activity that originates from the each IP address, wherein the subset of the set of access records includes: at least one access record that indicates a negative behavior, and at least one access record that does not indicate a negative behavior, wherein at least one of the one or more percentages is based at least on a fraction, of said set of access records that originates from the each IP address, caused by users who were not logged in when accessing a web resource;
determining a plurality of multiplicative products, wherein each of the plurality of multiplicative products is based on at least one of the one or more percentages;
determining an arithmetic sum based on the plurality of multiplicative products; and
categorizing said each IP address as suspicious if the arithmetic sum exceeds a score threshold;
wherein the method is performed by one or more computing devices.

12. The method of claim 11 wherein determining one or more percentages comprises determining a percentage that integrates at least one of:
a denied percentage of account creation attempts, originating from said each IP address, that were denied because of suspicious activity originating from said each IP address;
a challenged percentage of login attempts, originating from said each IP address, that involved a heightened security challenge, or
a forbidden percentage of resource requests, originating from said each IP address, that are forbidden.

13. The method of claim 11 wherein determining one or more percentages comprises determining at least one of:
an authenticated percentage of the set of access records that have a user account identifier,
a banned percentage of login attempts of the set of access records that were denied because a user account was disabled, or
an unauthenticated percentage of the set of access records that do not have a user account identifier.

14. The method of claim 11 wherein determining one or more percentages comprises determining at least one of:
a percentage, of all user accounts that were originally registered from the each IP address, that involve a user account that later became restricted for security purposes based on behavior associated with the user account, or
a percentage, of all account registration attempts from the each IP address, that experienced an email delivery failure during registration email address verification.

15. The method of claim 11 further comprising:
receiving a request that originated from a particular IP address;
in response to receiving the request:
determining a particular score that is associated with the particular IP address, and
processing the request based on the particular score.

16. A system comprising:
a storage subsystem configured to store interaction data that indicates a plurality of interactions between user accounts and an online entity;
wherein, for each interaction of the plurality of interactions, the interaction data indicates a source address associated with a user account; and
wherein at least two interactions of the plurality of interactions indicate a same source address that is associated with a plurality of user accounts;
one or more computers connected to the storage subsystem and configured to retrieve the interaction data from the storage subsystem and, for each source address of a plurality of source addresses indicated in the interaction data, perform:
determine an aggregate measurement indicating aggregate behavior of one or more user accounts that are associated with an aggregate subset of interactions of the plurality of interactions, wherein each interaction of the aggregate subset is associated with said each source address;
determine a negative measurement indicating negative behavior of at least one user account of the one or more user accounts that is associated with a negative subset of interactions of the aggregate subset, wherein the negative measurement is based on a fraction, of webpage views that originated from said each source address, caused by users who were not logged into the online entity during an interaction, wherein the negative measurement is further based on at least one of:
a) a count of account creation attempts that were denied because of suspicious activity originating from said each source address, or
b) a fraction, of login attempts that originated from said each source address, that involved a heightened security challenge; and
generate, based on the negative measurement and the aggregate measurement, a score that indicates a reputation of said each source address.

17. The system of claim 16 wherein the negative measurement is based at least on a fraction, of webpage views that originated from said each source address, caused by users who were logged into the online entity during a webpage view.

18. The system of claim 16 wherein the negative measurement is based at least on a count of account creation attempts that were denied because of suspicious activity originating from said each source address.

19. The system of claim 16 wherein the negative measurement is based at least on a fraction, of login attempts that originated from said each source address, that involved a heightened security challenge.

* * * * *